(12) United States Patent
Taveau et al.

(10) Patent No.: US 10,318,948 B2
(45) Date of Patent: Jun. 11, 2019

(54) CLOUD-BASED APPLICATION SECURITY

(71) Applicant: PAYPAL, INC., San Jose, CA (US)

(72) Inventors: Sebastien Taveau, Redwood City, CA (US); Nadav Naaman, Menlo Park, CA (US)

(73) Assignee: PAYPAL, INC., San Jose, CA (US)

( * ) Notice: Subject to any disclaimer, the term of this patent is extended or adjusted under 35 U.S.C. 154(b) by 250 days.

(21) Appl. No.: 15/468,008

(22) Filed: Mar. 23, 2017

(65) Prior Publication Data

US 2017/0206519 A1 Jul. 20, 2017

Related U.S. Application Data

(63) Continuation of application No. 13/165,180, filed on Jun. 21, 2011, now abandoned.

(Continued)

(51) Int. Cl.
| | |
|---|---|
| *G06Q 40/00* | (2012.01) |
| *G06Q 20/32* | (2012.01) |
| *G06Q 40/04* | (2012.01) |
| *G06Q 20/34* | (2012.01) |
| *G06Q 20/36* | (2012.01) |

(Continued)

(52) U.S. Cl.
CPC ....... *G06Q 20/3226* (2013.01); *G06Q 20/227* (2013.01); *G06Q 20/32* (2013.01); *G06Q 20/3224* (2013.01); *G06Q 20/3572* (2013.01); *G06Q 20/36* (2013.01);

(Continued)

(58) Field of Classification Search
CPC .................................................. G06Q 40/00
See application file for complete search history.

(56) References Cited

U.S. PATENT DOCUMENTS

| | | | |
|---|---|---|---|
| 5,839,117 A | 11/1998 | Cameron et al. | |
| 6,018,724 A | 1/2000 | Arent | |

(Continued)

FOREIGN PATENT DOCUMENTS

CN 1453731 11/2003

OTHER PUBLICATIONS

Ann Kjos, The Merchant-Acquiring Side of the Payment Card Industry: Structure, Operations, and Challenges, Oct. 2007, Federal Reserve Bank of Philadelphia, web, 1-28 (Year: 2007).*

(Continued)

*Primary Examiner* — I Jung Liu
(74) *Attorney, Agent, or Firm* — Haynes and Boone, LLP (57) ABSTRACT

Systems, methods, and computer program products for providing cloud-based application security are disclosed. For example, a server part of a cloud-based application may determine a plurality of security challenges for authorizing a request based on a plurality of security settings of a user account and one or more attributes of the request, issue a first-level authorization challenge and a second-level authorization challenge based on the determining, identify a plurality of available resources from the user account for the request, and responsive to successful completion of the first-level authorization challenge and the second-level authorization challenge, automatically apply two or more of the available resources from the user account to fulfill the request based on the one or more attributes of the request and a physical location associated with the request.

20 Claims, 8 Drawing Sheets

Related U.S. Application Data (60) Provisional application No. 61/359,667, filed on Jun. 29, 2010.

(51) Int. Cl.
 *G06Q 20/22* (2012.01)
 *G06Q 20/40* (2012.01)

(52) U.S. Cl.
 CPC ....... *G06Q 20/3674* (2013.01); *G06Q 20/405* (2013.01); *G06Q 40/00* (2013.01); *G06Q 40/04* (2013.01)

(56) References Cited

U.S. PATENT DOCUMENTS

| | | | |
|---|---|---|---|
| 7,930,249 | B2 | 4/2011 | Roberts |
| 8,271,307 | B2* | 9/2012 | Butcher, III ........... G06Q 40/08 705/37 |
| 8,275,708 | B1* | 9/2012 | Dennes .................. G06Q 40/02 705/35 |
| 2003/0204457 | A1 | 10/2003 | Arias |
| 2003/0233327 | A1 | 12/2003 | Keresman et al. |
| 2004/0024703 | A1 | 2/2004 | Roskind |
| 2007/0016535 | A1 | 1/2007 | Tedesco et al. |
| 2007/0038924 | A1 | 2/2007 | Beyer et al. |
| 2008/0121698 | A1 | 5/2008 | Bortolin et al. |
| 2009/0157475 | A1 | 6/2009 | Crafton et al. |
| 2009/0210347 | A1 | 8/2009 | Sarcanin |
| 2009/0254484 | A1 | 10/2009 | Forero et al. |
| 2009/0288012 | A1 | 11/2009 | Hertel et al. |
| 2009/0292599 | A1 | 11/2009 | Rampell et al. |
| 2009/0307117 | A1 | 12/2009 | Greiner et al. |
| 2010/0125495 | A1 | 5/2010 | Smith et al. |
| 2010/0145861 | A1 | 6/2010 | Law et al. |
| 2010/0262538 | A1 | 10/2010 | Rosenberger |
| 2010/0320266 | A1 | 12/2010 | White |
| 2012/0252360 | A1 | 10/2012 | Adams et al. |

OTHER PUBLICATIONS

International Searching Authority, Search Report and Written Opinion of the International Searching Authority for PCT/US2011/041495, dated Nov. 18, 2011, 6 pages.

Daswani et al., "Swaperoo: A Simple Wallet Architecture for Payments, Exchanges, Refunds, and Other Operations," Paper [online], Sep. 3, 1998, pp. 1-20, Proceedings of the 3rd USENIX Workshop on Electronic Commerce, Boston, Massachusetts, USA.

Ezell, Stephen, "Explaining International IT Application Leadership: Contactless Mobile Payments," The Information Technology & Innovation Foundation, Nov. 2009, pp. 1-56.

* cited by examiner

Progress bar changes to a top banner "Ready to Pay"

Default funding card animates to the top

Once card is in position buttons appear. User can tap POS terminal

Banner "Ready to pay" changes to animated "Processing" banner

Funding card begins to fade away as receipt for the purchase comes into view

Once card is off screen "Details" and "Done" button appear.

CLOUD-BASED APPLICATION SECURITY

CROSS REFERENCE TO RELATED APPLICATIONS

The present application is a continuation of U.S. patent application Ser. No. 13/165,180, filed Jun. 21, 2011, and claims priority to U.S. Provisional Patent Application No. 61/359,667, filed Jun. 29, 2010, both of which are incorporated by reference in their entirety.

BACKGROUND

Field of the Invention

The present invention generally relates to making payments using mobile devices, and more particularly, to using the mobile device to intelligently make payments.

Related Art

Electronic payments are becoming a preferred method of payment because they offer advantages to the user not present with traditional physical payments. With a physical payment, the user is required to carry the funding instrument and present the funding instrument when ready to make a payment. Examples of physical funding instruments include cash, checks, credit cards, debit cards, coupons, gift certificates, gift cards, and the like. These can take up space in a user pocket, purse, or wallet. To reduce space, the consumer may not carry all funding instruments all the time, resulting in the possibility that a desired funding instrument is not available when the consumer is ready to use it at a point of sale (POS). Such physical funding instruments may also be lost or stolen. Thus, physical "wallets" can be cumbersome, inconvenient, and prone to loss.

To remedy this, mobile devices have been and are being used to make payments through payment providers, such as PayPal, Inc. of San Jose, Calif. Such payment providers typically allow a consumer to make a payment through the user's mobile device, such as through the use of barcodes, communication between the payment provider and the merchant, and other methods. After authentication and/or authorization, the payment is made through a user account with the payment provider, where the account is funded through a funding source, such as the user's bank or credit card. The funding source is typically a single default source selected by the user.

While this may allow the consumer to forego carrying credit cards, bank cards, and cash, the user must still decide whether to use the payment provider service, another payment service on the mobile device, or a physical funding instrument. This can be disadvantageous, which also applies to physical wallets, because the user must decide which of the many possible funding instruments to use for a particular purchase. This may result in the user choosing a payment instrument that is not the "best" choice for the transaction.

Therefore, a need exits for a payment solution that overcomes the disadvantages described above with conventional payment methods.

SUMMARY

According to one embodiment, a consumer has an account with a payment provider, such as PayPal, Inc. The account includes at least one funding source, and preferably several. When the user is ready to make a purchase or payment, such as at a point of sale, the payment provider selects what funding source (e.g., Visa, AMEX, credit cards associated with different rewards programs, PayPal, bank account, coupons, gift cards, etc.) to use based on the transaction information, including the amount, type of purchase, merchant, location, etc. The selection can be based on user selected preferences, payment history of user, goals, preferred or incentivized payment sources of the merchant, or any combination of logic. For example, there may be discounts or other rewards at a certain store if a specific card is used, the user may want to primarily use a card to get sufficient reward points for a goal, the user may want to limit certain cards to a maximum monthly or transaction amount, an AMEX Hilton card may be selected for use at a Hilton hotel, etc.

This greatly reduces the time and effort for the user to decide which card or other funding instrument to use. This also helps the user make use of coupons, etc., as part of the funding.

The payment provider may also provide payment directly from a funding source to the merchant so that the recipient need not have an account with the payment provider. This may also apply when the user does not have a payment provider account.

According to another embodiment, different authentication or security levels are applied to different uses of the user device. For example, payments may require one type of authentication, while non-payments (such as information transfers or displays) may require another type of authentication. Within payments or non-payments, there may be additional different security levels. For example, higher security may be required for higher payment amounts and use or display of more sensitive information, such as social security number, credit card number, and the like.

These and other features and advantages of the present invention will be more readily apparent from the detailed description of the embodiments set forth below taken in conjunction with the accompanying drawings.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to various embodiments, a smart digital wallet in a user's mobile device provides the user with recommendations or decisions on what funding instruments to use based on transaction information, user preferences, user history, and/or funding instrument information. The smart wallet may also be customized with different levels of security for making a payment, based in part on user preferences, transaction amount, location, and other factors. Thus, the user's mobile device can be used as a smart wallet to replace physical funding instruments, while providing numerous advantages not available with a physical wallet.

Figure 1:
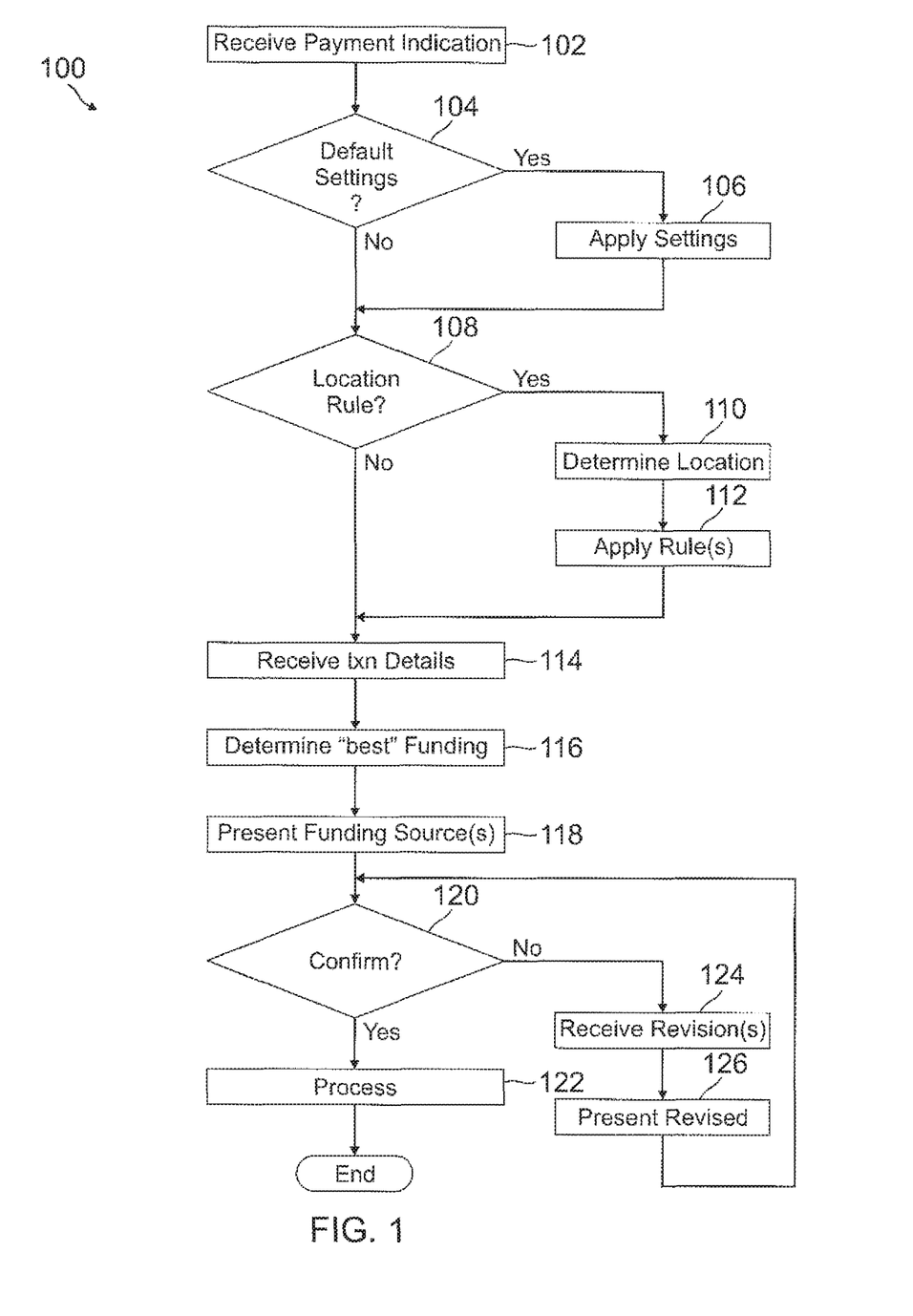
FIG. 1 is a flowchart showing a process a payment provider performs to process a payment from a user's smart wallet, according to one embodiment.

FIG. 1 is a flowchart showing a process 100 a payment provider performs to process a payment from a user's smart wallet, according to one embodiment. At step 102, the payment provider receives an indication that the user is ready to make a payment for items. Items, as used herein, may include physical goods, digital goods, services, donations, and anything that the user is making a payment for, to, or regarding. In this embodiment, the user is at a physical location or point of sale (POS) for the payment, such as at a store. In other embodiments, the user may be shopping online and making the payment through a computing device, such as a PC.

The indication may be received in any number of ways. One example is the user accessing a payment app a user mobile device at the POS, which makes a call to the payment provider through the mobile device. The use may enter credentials to access the user's account and enable payment through the mobile device. Another example is the merchant communicating a purchase transaction to the payment provider at the POS through a merchant device. These can be when the user begins a checkout process, during a checkout process, or after all items have been scanned and totaled. In one embodiment, the minimum information communicated at step 102 is a desire for the user to make a payment and user identity/account information. The latter allows the payment provider to access the user's account and data associated with the account.

Once the user's account is accessed, the payment provider determines, at step 104, if there are any default settings to the user's account for payments. Default settings may be determined by the user, such as user defined preferences, by the payment provider, such as based on payment history, or a combination of the two. Default settings include information about the use of funding instruments associated with the user account. For example, the user may have an American Express Hilton Reward credit card, a Citibank debit card or bank account, a Visa Southwest Airlines Reward credit card, and a Visa gift card as some of the funding sources for the user account. The AMEX card may be the main funding source, followed by the Visa gift card, and others in a particular order. So, with a purchase, the AMEX card would be the preferred funding instrument. However, there may be situations where the AMEX card cannot be used, such as at merchants/sites/locations where AMEX is not accepted, the AMEX card is rejected (such as expired, limit reached, fraud suspected, etc.). If the AMEX is unavailable for use, the Visa gift card would be the next choice. However, the Visa gift card may be unavailable because its value has been depleted. The next funding instrument would then be tried.

The default settings may be changed as needed. For example, the AMEX card may be the first choice because the user wants to accumulate Hilton points for an upcoming vacation stay. However, once enough points are accumulated or no longer needed, the user may replace the AMEX card with the Visa card so that the user can accumulate points quicker for free flights. Such changes may be made by the user through the user's account page with the payment provider.

If there are default settings, those settings are applied at step 106. The system also determines, at step 108, whether there are any location-based restrictions or rules for any of the user's funding instruments. For example, a certain gift card or coupon may only be used within the United States. Another coupon may only be used in California. The Visa gift card may be used anywhere, but may have a bonus if used in Arkansas. The bonus may be a 10% credit on the gift card. The Arkansas use may be Visa wanting more spending in Arkansas to help the Arkansas economy in wake of its recent earthquake.

If there is at least one location-based rule, a location of the user (or POS) is determined at step 110. This may be through a location service or function associated with the user's mobile device. Thus, when the user is ready to make a payment, the user's location will be known through the user's mobile device. Typically, the location is at the POS. The user location may also be determined in other ways. One example is the merchant communicating the identity of the user to the payment provider, which informs the payment provider that the user is with the merchant, where the merchant location is known by the payment provider. The payment provider applies the one or more location-based rules at step 112. This may include changing the priority of the user defined preferences accordingly.

The system receives, at step 114, transaction details, which can be through the merchant or the user. Transaction details may include information about the items scanned or to be purchased, such as description, type, quantity, and price, merchant information, such as name, account number, main address, local store address, phone number, the transaction date, and the like, and amount of the transaction, including taxes and any discounts/coupons/rewards applied or to be applied.

Using this and any other applicable information, the "best" one or more funding instruments are determined, at step 116, for the user to use in the present transaction. The determination may include processing all or a portion of the information available and received about the user, the merchant, the location, and the transaction. For example, a particular merchant may only accept certain funding instruments (such as Visa and MasterCard only for credit cards), not accept certain funding instruments (such as no American Express or coupons), and/or provide a reward or other incentive for using a particular funding instrument (such as a store branded credit card).

In another example, a particular coupon or gift card may be applicable to one or more purchases in the transaction. Such coupons or gift cards may then be selected for use. Certain coupons, gift cards, and the like may have upcoming expiration dates. Based on the date of the transaction and the expiration dates of applicable funding instruments, appropriate funding instruments may be selected to be used for this transaction. For example, funding instruments about to expire may be prioritized over later-expiring funding instruments.

Once funding instruments are selected for the current transaction, the user may be presented with the selection(s), at step 118, on the user's mobile device. The user may see where each funding instrument is to be applied and how, along with amount applied if appropriate. For example, a certain purchase or item may only allow a certain dollar amount to from a gift card, voucher, or coupon to be applied to the purchase.

Next, the payment provider makes a determination, at step 120, whether the user has confirmed the selected funding instruments. This determination may include receiving an electronic signal from the user device of a confirmation resulting from the user tapping or otherwise selecting a "confirm" or similar link/button on the device. If a confirmation is received, the transaction may be processed, at step 122, with the selected funding instruments. Processing may be through the payment provider, where the payment provider receives payment details through the user device or the merchant, determines whether one or more payments can be approved, debiting user account(s) and crediting merchant account(s) immediately or at a later time, and sending a notification to the user and/or the merchant that the payment for the transaction has been approved or denied. Processing may also be directly through the user. For example, the user may simply present a physical credit card, where processing is through conventional credit card processing with the merchant.

If the user does not confirm the selected funding sources, the user may decide to revise the selection, such as adding one or more different funding sources, deleting one or more funding sources, or applying a funding source differently (e.g., using a lesser amount of a gift card). For example, even though the payment provider selected the AMEX card based on the user's previously set preference (the user had wanted to accumulate hotel points), the user may no longer need the points. This may be due to the user obtaining a sufficient amount of points, the hotel stay changed, or other reasons. The user also may not have changed user preferences yet. As a result, the user may replace the AMEX card with the Visa card.

In one embodiment, the user can revise selected funding instruments through the user device. For example, the user may select a funding for revision. The selected funding source may be deleted or otherwise revised accordingly, such as through user actions through the user device. A new funding source may be added, such as by selecting from a list of available funding sources. The list can be in any form and accessed through any number of ways, including a drop down menu or a new window on a browser or app.

After one or more revisions to the selected funding sources are made by the user, the revisions are communicated to and received by the payment provider at step 124. Once received, the payment provider may transmit the user-revised payment instrument selections to the user at step 126. The user may view the revised payment selections, such as on the user device, and confirm or revise again as needed using the steps described above. When the user confirms the payment instruments, the payment can be processed at step 122.

Note that the various steps and decisions above may be performed in different sequences and select ones may be omitted, as well as additional steps and decisions added.

Thus, the user is able to use the "best" funding instruments to pay for a transaction using selections from the payment provider based on user set preferences, location, transaction details, merchant, date, and other factors. Payment can be made through the user's mobile device, thereby eliminated the need for the user to carry physical funding instruments like cash, credit cards, debit cards, checks, coupons, and gift cards.

Figure 2:
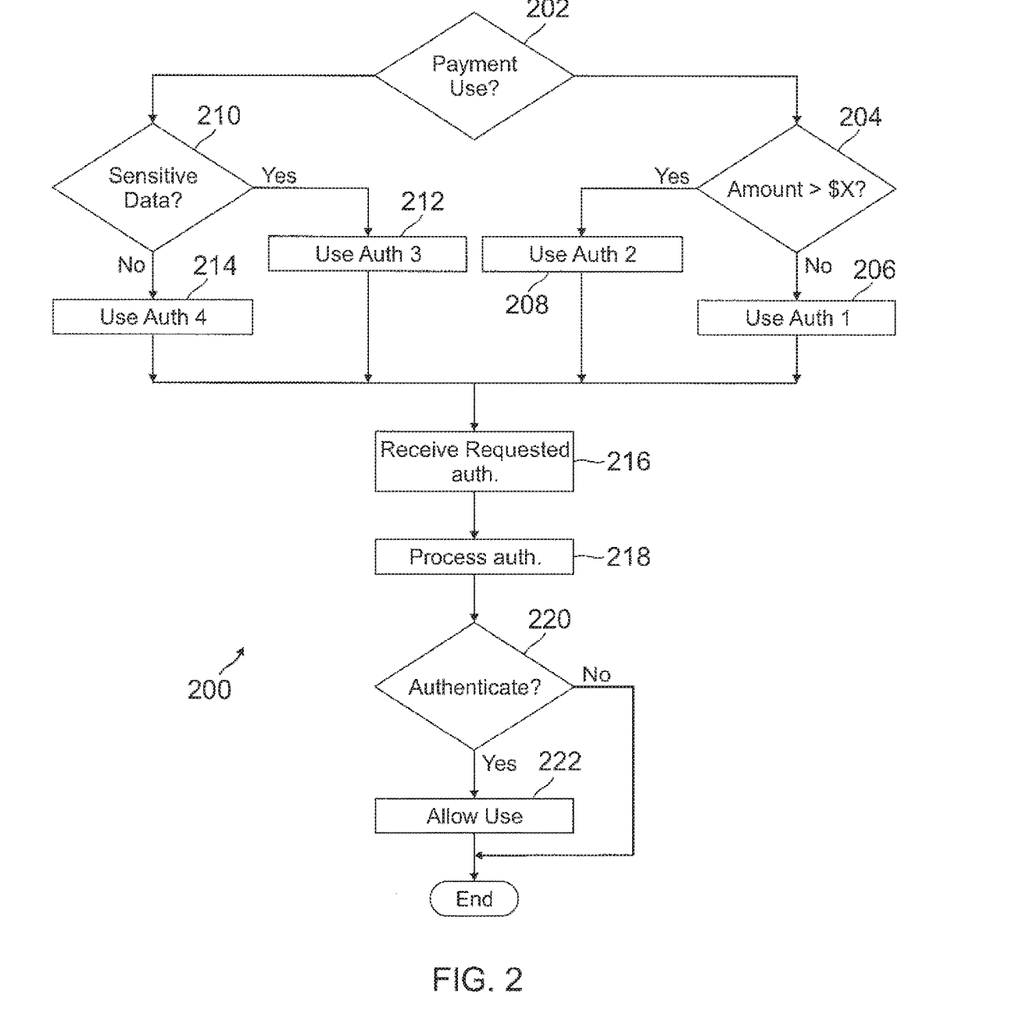
FIG. 2 is a flowchart showing a process for using a user mobile device as a digital wallet with different authentication levels according to one embodiment.

FIG. 2 is a flowchart showing a process 200 for using a user mobile device as a digital wallet with different authentication levels according to one embodiment. A typical physical wallet may contain non-payment cards, such as medical insurance cards, frequent flyer numbers, hotel loyalty numbers, social security card, auto club card, and the like, in addition to funding instruments like those discussed above. A mobile device, such as smart phone or tablet, may be able to store such personal information of the user, such that the mobile device can become more like a physical wallet in that it can then contain both payment instruments and user information.

To use the mobile device for payment, the user typically is required to enter a password or PIN and a user/device identifier, such as a user name, email address, or phone number, unless the user/device identifier is automatically communicated to the payment provider through the mobile device. This can be time-consuming and cumbersome, especially with the small physical and virtual keypads associated with mobile devices. However, such authentication is needed to protect the funding instruments and prevent unauthorized users to make payments from the user's account.

There may be other data or functions in the phone that do not require the authentication levels of payments. For example, a frequent flyer number or transmitting of a frequent flyer number may not require the level of security as sending a payment. Other information, such as the user's social security number, may require additional security. Even payments may allow different levels of security. For example, a payment transaction of less than $20 may not require as much security as a payment transaction of greater than $200. Thus, FIG. 2 illustrates an example of how a mobile device or user of the mobile device may be authenticated for different information or transactions using the mobile device.

At step 202, a determination is made whether the mobile device, for the current use, is to be used for payment. Payment transactions typically will require stronger authentication. The determination may include receiving an indication from the user through the mobile device, such as selecting a payment app, or from a recipient, such as a seller, through a recipient device identifying the user or payer. If the mobile device will be used for a payment transaction, a determination is made, at step 204, whether the amount of the payment transaction will be greater than a certain amount, X. This amount can be set by the user or the payment provider. Higher amounts typically will require stronger authentication. The amount can include use of funds from the user's account with the payment provider, use of coupons, gift cards, vouchers, etc., and/or use of other funding sources such as credit cards.

If the anticipated payment amount is less than or equal to X, the payment provider may require the user to authenticate using a first authentication level, Auth1, at step 206. Auth1 may simply require the user to unlock the mobile device or access a payment app. If the anticipated payment amount is greater than X, the user may be required, at step 208, to authenticate through a second authentication level, Auth2, which is stronger than Auth1. An example of Auth2 may include entry of a user PIN, biometric information, a password, or other data, in addition to what was required at step 206.

If, as determined, at step 202, the current transaction is not for payment, a determination may be made, at step 210, whether the transaction involves "sensitive" or "confidential" information. Examples of sensitive information may include the user's social security number, a bank account number, a password, credit card numbers including security codes, debit card numbers, etc. Examples of non-sensitive information stored in the mobile device may include account numbers for airline loyalty programs, hotel loyalty programs, merchant loyalty programs, and the like, medical insurance policy number, dental insurance policy number, AAA membership number, etc. The user may determine which information is sensitive and which is not, such as by designating specific data or types of data.

At step 212, the user is required to authenticate at a third authentication level, Auth3, when the transaction involves exposure or transmission of sensitive information. Auth3, in one embodiment, is a stronger authentication than Auth1, but weaker than Auth2. In another embodiment, Auth3 is the same as Auth2. Auth3 may include requiring the user to enter an identifier, such as an email address, phone number, or user name.

If the information is not sensitive, the user may be requested to authenticate using a fourth authentication level, Auth4, at step 214. Auth4 may be the same as Auth1. In another embodiment, Auth4 is weaker than Auth1, Auth2, and Auth3. For example, Auth4 may include the user simply being able to use the mobile device, and thus effectively not requiring any authentication, just possession of the device.

Note that the above authentication levels are just examples and not limiting. For example, additional authentication levels may be employed. This may be due to more than two levels of authentication for a payment, with the different levels based on a plurality of transaction amount thresholds. Information may also be divided into more than two categories of just sensitive and non-sensitive. Furthermore, determinations, in addition to or in place of, whether the transaction is for a payment and whether the transaction involves sensitive information stored in the mobile device may be included.

After the specific authentication level is requested/required, the requested information is received, at step 216, from the user, such as through the user mobile device. The information may be received by the user entering the requested information, such as through a keypad, keyboard, touch pad, touch screen, or other data input. Once received the information is processed by the payment provider, at step 218. Processing may include determining if the received information is what was requested and whether the received information was what was expected. This can be through accessing the user's account and checking authentication information of the user.

A determination is then made, at step 220, whether the user can be authenticated. This determination may include typical authentication procedures for the payment provider, including any fraud analysis, account restrictions, transaction limits, etc.

If the user is authenticated, the transaction moves forward at step 222. The transaction can proceed with a payment process, a communication, display or access of data/information, or other use of the mobile device. However, if the user authentication fails, the transaction may not be allowed to proceed until the user is authenticated. Thus, the payment provider may allow the user one or more additional attempts to authenticate, using the same authentication requests or something different. For example, the user may be asked a security question.

Accordingly, the payment provider (and/or the user) may set different levels of security to be linked on the access to the wallet or some part of the wallet. As an example, the user may not care about protecting coupons or some loyalty components (e.g., frequent flyer card or movie theater reward card), but will care about protecting credit cards or payment instruments. The basic default security settings of the wallet may be speed of transaction over higher security (resulting in more friction or interaction from the user). However, the "smarter" the wallet will be, the better security with little user interaction can be provided by the payment provider.

For an example, a user could decide that for any transaction, the user does not want to be asked anything. As long as the smart wallet is triggered properly, the transaction will go through. Some users, being more cautious, may want to see any transaction and will ask to be prompted for information of transactions going through the smart wallet. Other users, wanting more security, could decide to be prompted for an actual validation of the transaction by entering a PIN, a password or a fingerprint/biometric component. The level of security could be linked also to the amount of the transaction, as mentioned above. For example, under $20, no action required, between $20 and $50, get a prompt to inform the user, above $50, enter a PIN. These levels could be flexible and decided by the user but again, with a validation/association to the risk profile managed by the payment provider.

Thus, using the above, a user may have multiple security choices when setting up the user's mobile device and using the mobile device for different transactions or uses. This can provide a more frictionless user experience by not requiring the user to enter passwords/PINs or biometric information for all uses of the phone. Multiple security choices can also protect the user from fraudulent uses of the mobile device by requiring heightened or stronger authentication for higher payments or access to extremely sensitive information.

There may be several components to such a digital wallet described above, including a user profile, a risk profile, and stored value. A user may create a user profile for the smart wallet. Typically, the more information the user provides, the "smarter" the wallet. The payment provider can use this information to make a more informed decision on funding instruments for each transaction. Examples of what the user may enter into the profile include spending preferences, spending limits, goals, preferred funding instruments, etc. The user profile may be revised by the user, such as by revising profile information. The profile may also be revised by the payment provider, such as based on user transactions. For example, if the user continues to revise funding instruments suggested or presented by the payment provider, the payment provider may revise the user profile accordingly to reflect the user preferences.

Another component, the user's risk profile, may be based in part on parameters or information from the payment provider. For example, a long time user of the payment provider service with a verified address and payment instruments (e.g., a bank account linked and verified to the user's payment provider account) will have a better risk profile than a user who just registered and has not linked/verified any bank account to his account. Other elements that may be used to build a user risk profile include the make/model of the user's mobile device (e.g., if it is registered with the payment provider (phone number but also hardware/software configurations, browser, etc.)). While the main risk profile may be stored in the cloud, a subset version could be stored on the mobile device with a specific set of parameters, especially for "offline" transactions using a stored value.

Stored value is an amount of cash the user maintains as a balance with the payment provider for payments. The payment provider may create an "extrapolation" of this balance on the mobile device of the user. This stored value may be linked to the risk profile of the user. For example, if a user with an excellent risk profile has a $500 balance on his payment provider account, then the payment provider may grant the user access to a stored value of $400 or even $500. A new user to the payment provider with an unverified account may have a $500 account balance with the payment provider, but would be allowed to have a stored value emergency access of only $5 or $50 or whatever amount would be deemed to be an acceptable risk for the payment provider for that user.

In one embodiment, the payment provider maintains a dynamic stored value management system that will rely on the capacity to enforce a verification of stored value spending against the balance remaining in the cloud. With data based on the mobile device, the payment provider could feed back in real time the stored value spending history against the account balance on a constant basis. However, for some mobile devices with limited functions or for a mobile device going on low battery mode, the payment provider may not be able to feed back this history and will have to grant a level of access in an offline/off the cloud mode. In one example, a user is trying to catch the last subway and the user's mobile device is NFC-enabled, but the battery is almost depleted. However, a contactless reader from the subway company is set to power up the NFC chip on the user device and provide enough energy boost in a short period of time to retrieve a ticket and/or payment to grant access through the gate. At that point, the payment provider may not have the option to provide feedback for any verification to the cloud, but the "smart wallet" will be able to provide the needed funds offline (and register it in the transaction history log for future synchronization). By doing so, the payment provider is taking the risk but also making sure the user experience is on par with the user expectations or online payment transactions.

The payment provider may manage offline transactions from an offline transaction history log applied against the stored value balance. However, based on the risk profile, the payment provider may associate parameters to this function of the smart wallet, such as number of transaction, transaction amount, time offline, etc. and force back a connection to the cloud to update the smart wallet and the stored value balance.

In order to manage the user and risk profiles, as well as matching data to trigger some functions of the smart wallet (e.g., user location, user preference from that specific handset, transaction log history, etc.), a back-end module may be in charge of the "smart" or intelligence in the smart wallet. This could be managed by components that are part of the payment provider system. By doing so and creating this "intermediate" buffer, the payment provider can deliver a faster service towards the mobile device and manage the stored value better against the risk profile but also provide a needed protection/isolation of the main user account residing in the payment provider core system.

From a technical point of view, the wallet may be an application residing on the mobile device and linked to the payment provider wallet in the cloud. Some components of the wallet (e.g., user interfacing) could be normal applications such as Java applet, widget or native type. However security functions (anti-phishing, anti-spoofing mechanisms, etc.) may need to be disassociated from the basic function and be launched from a "trusted" element/component on the mobile device. This could be a hardware and/or a software component. Examples of such components include TrustZone from ARM, Embedded Secure Element, MicroSD Card or SIM card. In one embodiment, the smart wallet or account remains in the cloud at all times and the mechanism to protect it are never exposed to the user or mobile device. For this reason, the user and risk profiles are managed differently.

The following provides one example of a smart wallet use case. A Costco customer has an American Express Costco branded card. He also goes on a regular basis to a Costco store located near his home. By monitoring the payment history of this user in that store/merchant, the payment provider will know that the user pays 90% of the time with this Amex card. The 10% remaining are payments made with a debit card. Both instruments are registered with the user's payment provider account.

By using the smart wallet (and assuming the store or merchant is known by the payment provider or the payment provider has created a business addresses register), the user may then have his default payment instrument proposed to him as follows: 1) Payment instrument #1 (preferred): American Express Costco card; 2) Payment Instrument #2 (secondary): Debit card; 3) Payment Instrument #3 (Stored value): Payment Provider Balance extension in physical world. The user may edit or revise as desired.

This selection will be triggered by the user profile, his specific location (leverage from the GPS position) and (if enabled) a store "wireless" signal sent to the mobile device of the user and "read" by the smart wallet (e.g., through an NFC tag, Bluetooth (existing pairing) or other). By doing triangulation of data, the smart wallet may be able to enhance the choice of payment instruments.

When the user arrives at the cash register, he connects to the payment provider, such as through an NFC channel, a remote/online session, etc. Transaction information, such as amount, store, merchant, type of purchase, etc., is communicated to the payment provider, as well as the location of the user and/or POS and any other information needed by the payment provider. The payment provider accesses the user's account and preferences and decides which funding instrument or combination of funding instruments to use automatically.

Figure 3:
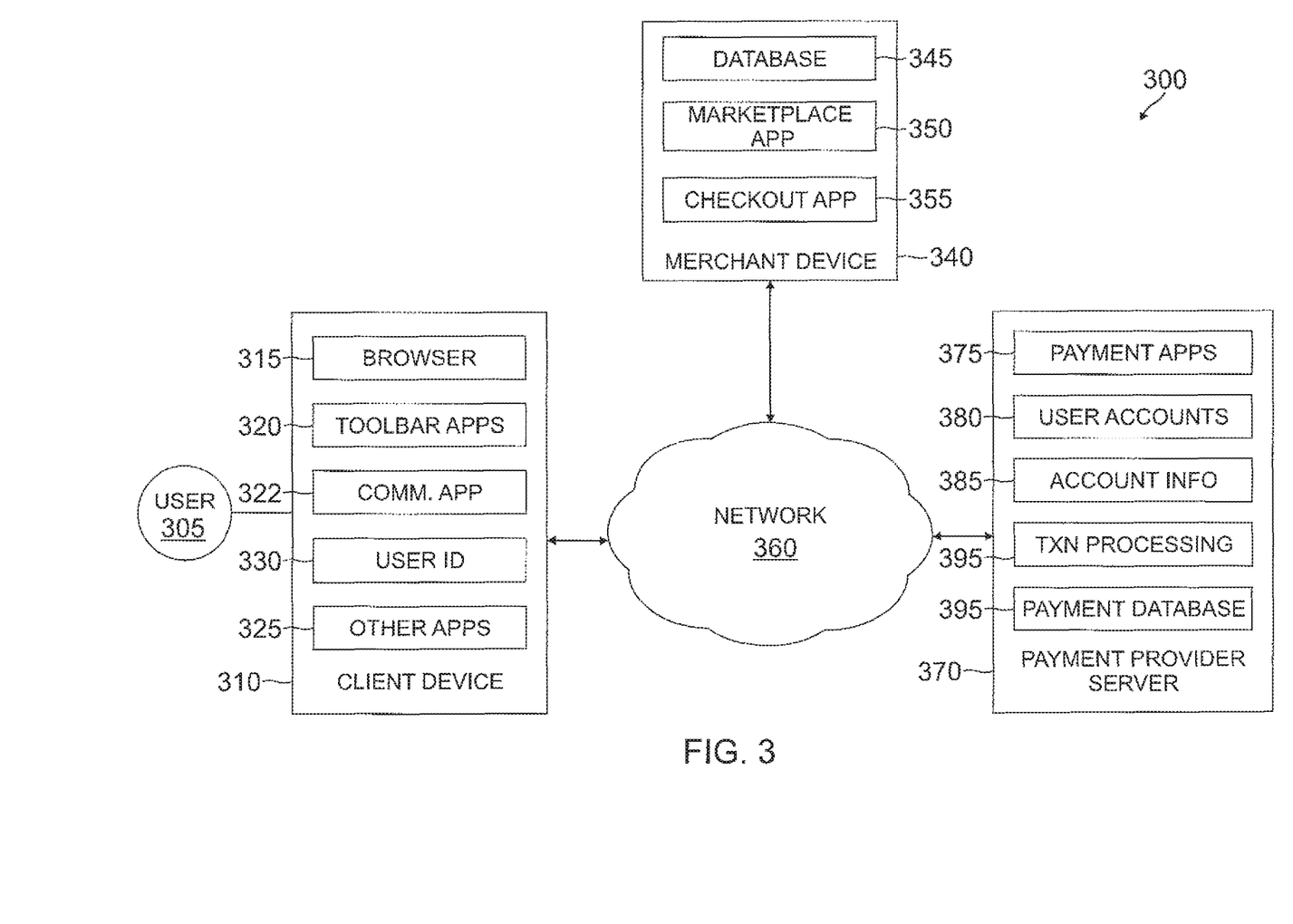
FIG. 3 is block diagram of a networked system suitable for implementing the process described herein according to an embodiment.

FIG. 3 is a block diagram of a networked system 300 configured to handle a transaction using a smart wallet, such as described above, in accordance with an embodiment of the invention. System 300 includes a user device 310, a merchant server 340, and a payment provider server 370 in communication over a network 360. Payment provider server 370 may be maintained by a payment provider, such as PayPal, Inc. of San Jose, Calif. A user 305, such as a sender or consumer, utilizes user device 310 to perform a transaction using payment provider server 370. Note that transaction, as used herein, refers to any suitable action performed using the user device, including payments, transfer of information, display of information, etc.

User device 310, merchant server 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet, including accessing a loyalty site. User device 310 may also include one or more toolbar applications 320 which may be used, for example, to provide client-side processing for performing desired tasks in response to operations selected by user 305. In one embodiment, toolbar application 320 may display a user interface in connection with browser application 315 as further described herein.

User device 310 may further include other applications 325 as may be desired in particular embodiments to provide desired features to user device 310. For example, other applications 325 may include security applications for implementing client-side security features, programmatic client applications for interfacing with appropriate application programming interfaces (APIs) over network 360, or other types of applications. Applications 325 may also include email, texting, voice and IM applications that allow user 305 to send and receive emails, calls, and texts through network 360, as well as applications that enable the user to communicate, transfer information, make payments, and otherwise utilize a smart wallet through the payment provider as discussed above. User device 310 includes one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider as further described herein. A communications application 322, with associated interfaces, enables user device 310 to communicate within system 300.

Merchant server 340 may be maintained, for example, by a merchant or seller offering various products and/or services in exchange for payment to be received over network 360. Merchant server 340 may be used for POS or online purchases and transactions. Generally, merchant server 340 may be maintained by anyone or any entity that receives money, which includes charities as well as retailers and restaurants. Merchant server 340 includes a database 345 identifying available products and/or services (e.g., collectively referred to as items) which may be made available for viewing and purchase by user 305. Accordingly, merchant server 340 also includes a marketplace application 350 which may be configured to serve information over network 360 to browser 315 of user device 310. In one embodiment, user 305 may interact with marketplace application 350 through browser applications over network 360 in order to view various products, food items, or services identified in database 345.

Merchant server 340 also includes a checkout application 355 which may be configured to facilitate the purchase by user 305 of goods or services identified by marketplace application 350. Checkout application 355 may be configured to accept payment information from or on behalf of user 305 through payment service provider server 370 over network 360, such as using selected funding instruments from the smart wallet. For example, checkout application 355 may receive and process a payment confirmation from payment service provider server 370, as well as transmit transaction information to the payment provider and receive information from the payment provider (e.g., a transaction ID).

Payment provider server 370 may be maintained, for example, by an online payment service provider which may provide payment between user 305 and the operator of merchant server 340. In this regard, payment provider server 370 includes one or more payment applications 375 which may be configured to interact with user device 310 and/or merchant server 340 over network 360 to facilitate the purchase of goods or services, communicate/display information, and send payments by user 305 of user device 310 and as discussed above.

Payment provider server 370 also maintains a plurality of user accounts 380, each of which may include account information 385 associated with individual users. For example, account information 385 may include private financial information of users of devices such as account numbers, passwords, device identifiers, user names, phone numbers, credit card information, bank information, or other financial information which may be used to facilitate online transactions by user 305. Advantageously, payment application 375 may be configured to interact with merchant server 340 on behalf of user 305 during a transaction with checkout application 355 to track and manage purchases made by users and which funding sources are used, as well as points for a user.

A transaction processing application 390, which may be part of payment application 375 or separate, may be configured to receive information from a user device and/or merchant server 340 for processing and storage in a payment database 395. Transaction processing application 390 may include one or more applications to process information from user 305 for processing an order and payment using various selected funding instruments as described herein. As such, transaction processing application 390 may store details of an order associated with a phrase from individual users. Payment application 375 may be further configured to determine the existence of and to manage accounts for user 305, as well as create new accounts if necessary, such as the set up, management, and use of a smart wallet for the user/mobile device.

Figure 4:
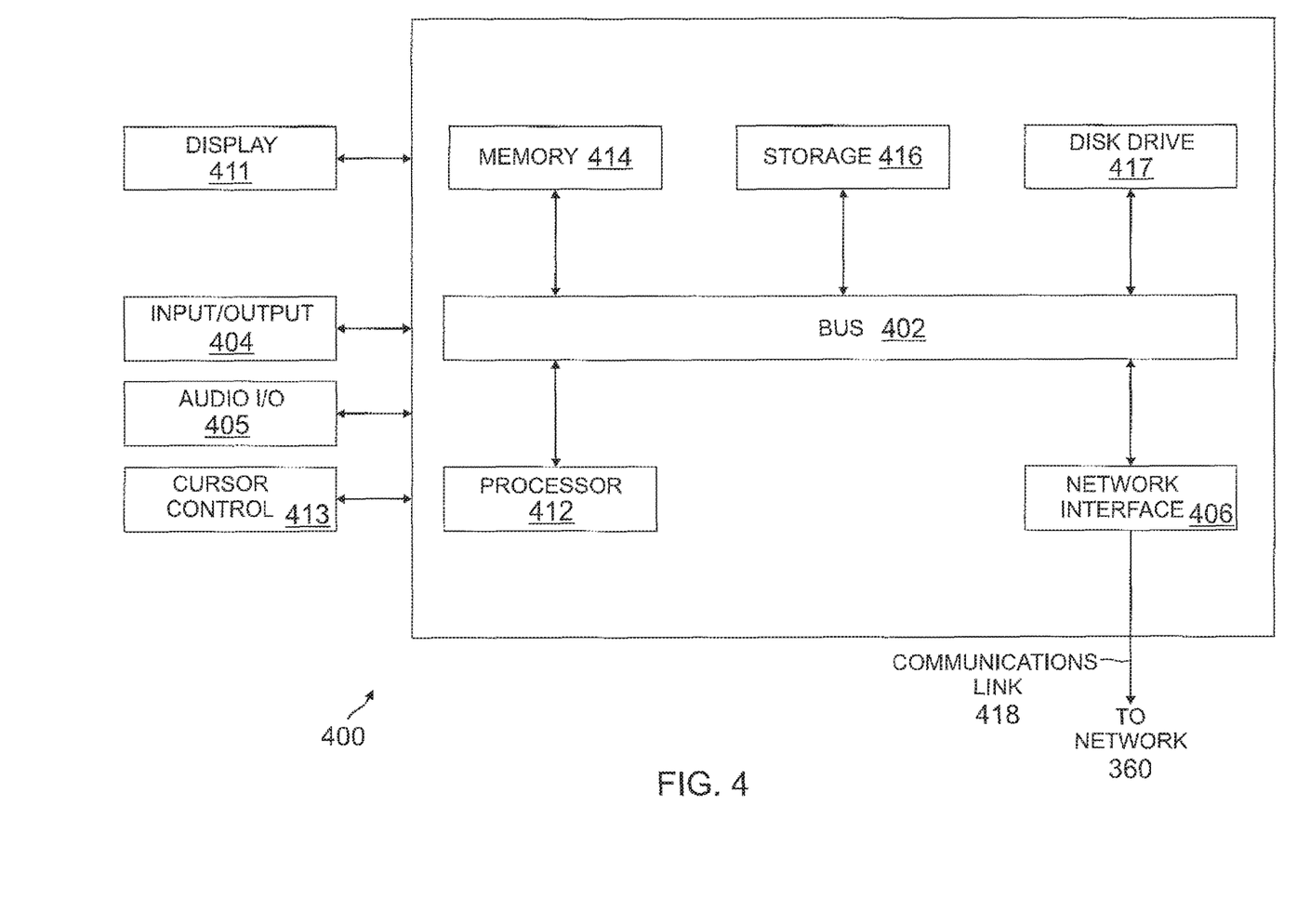
FIG. 4 is a block diagram of a computer system suitable for implementing one or more components in FIG. 3 according to one embodiment.
Figure 5A:
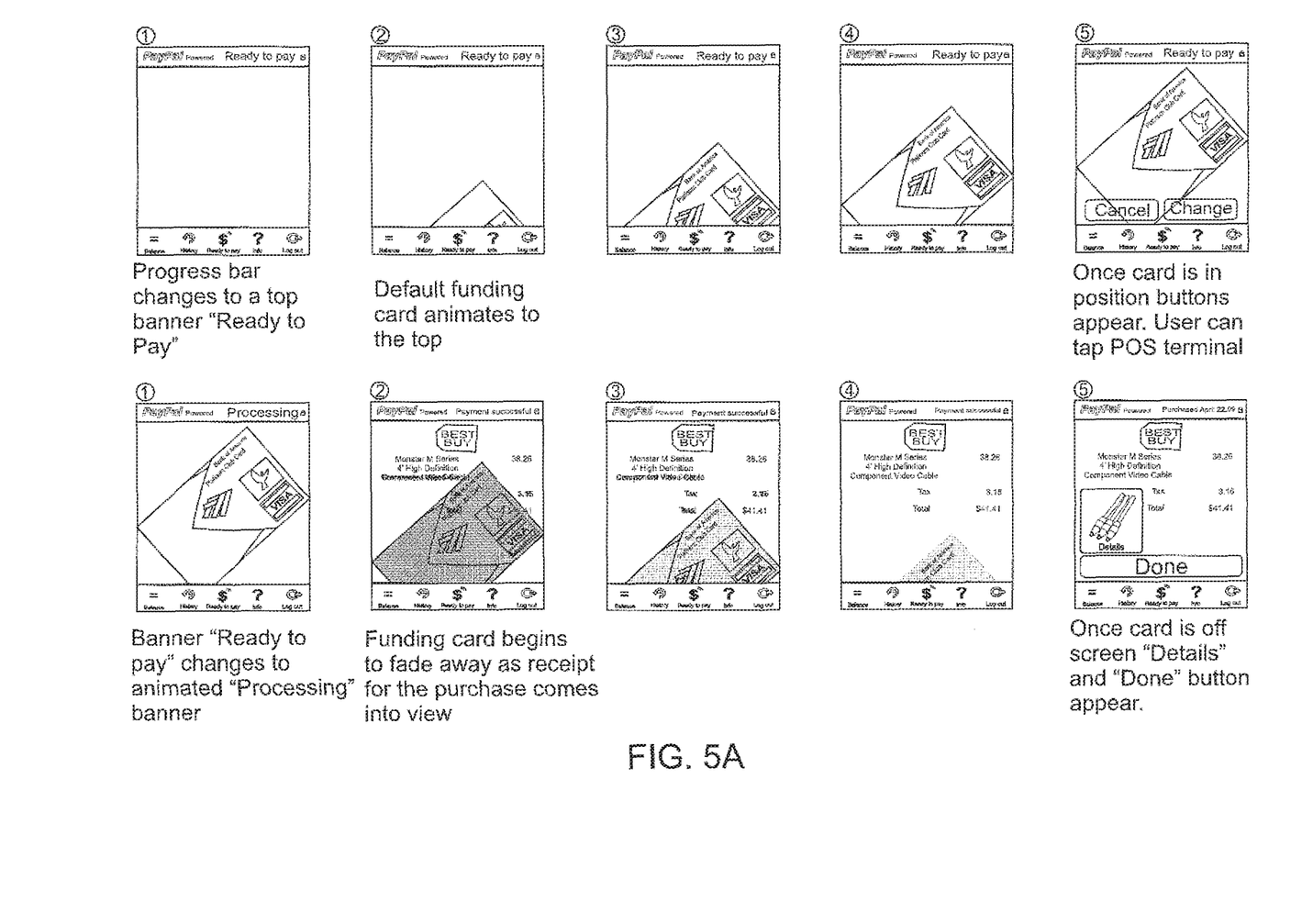
FIGS. 5A-5D are exemplary flows with sample screen shots showing various flows using a smart wallet according to one embodiment.
Figure 5B:
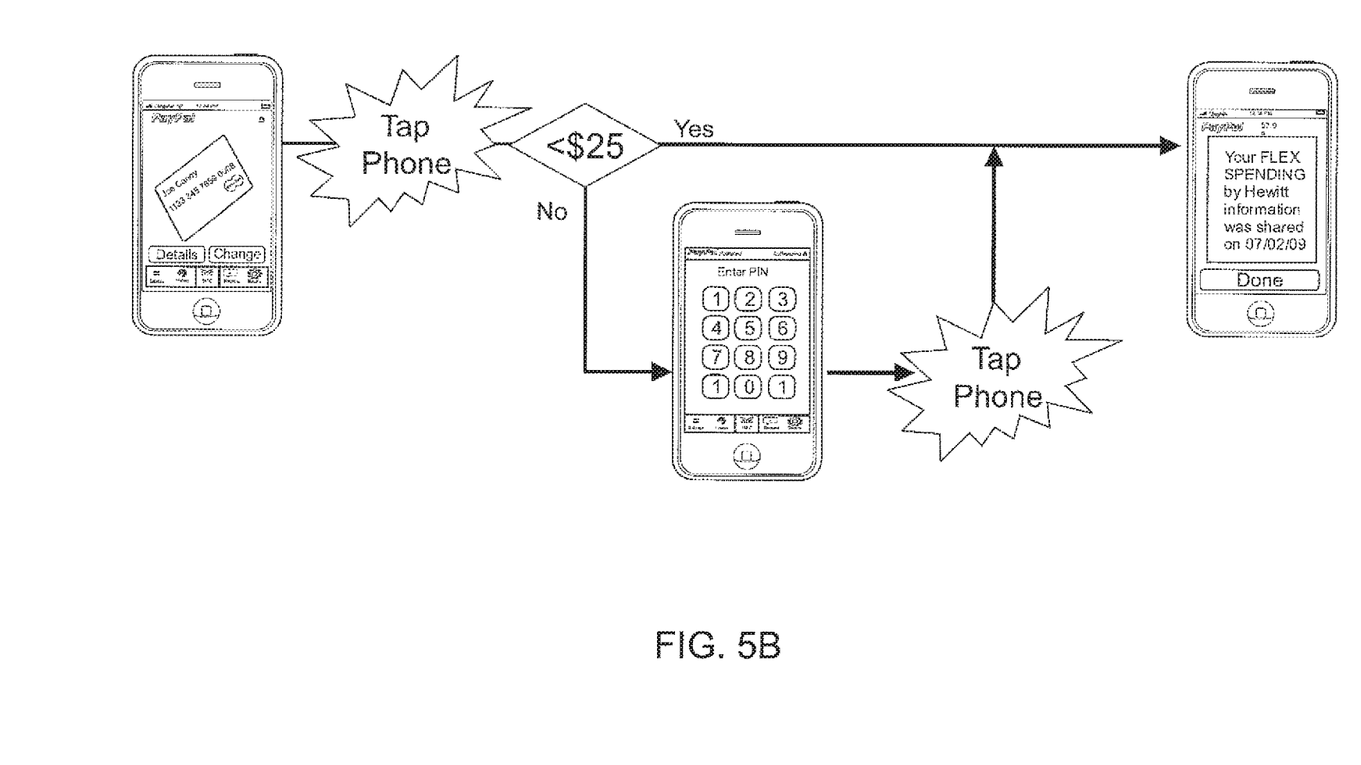
Figure 5C:
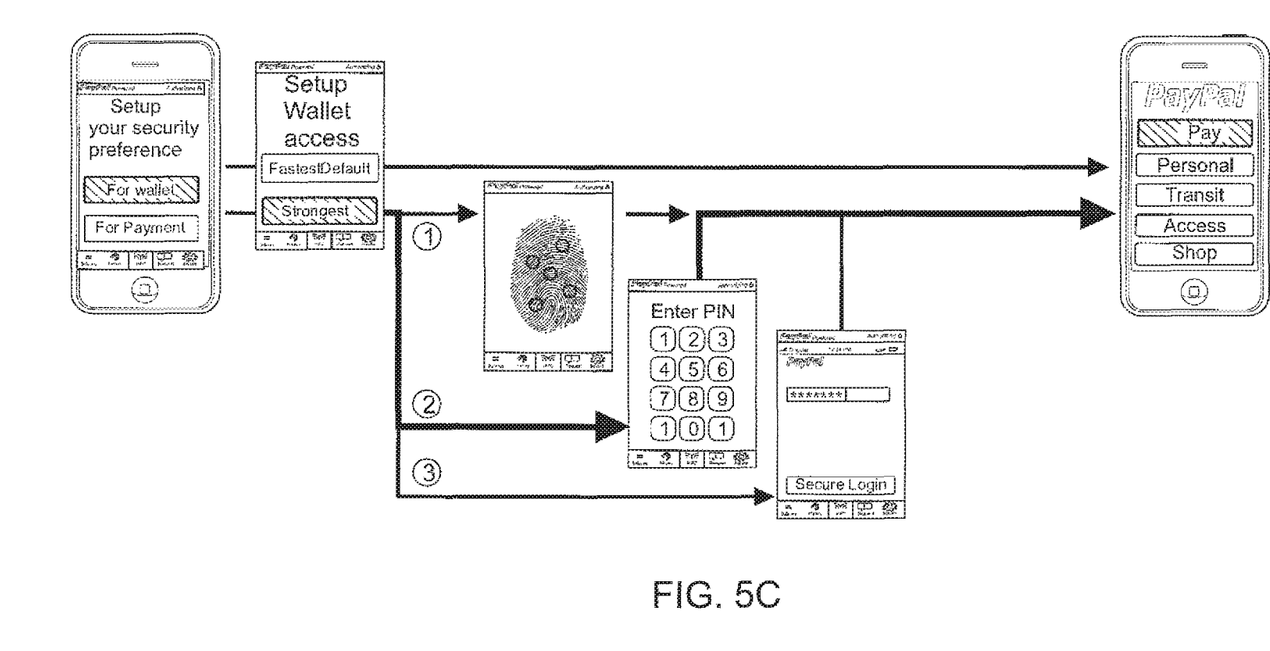
Figure 5D:
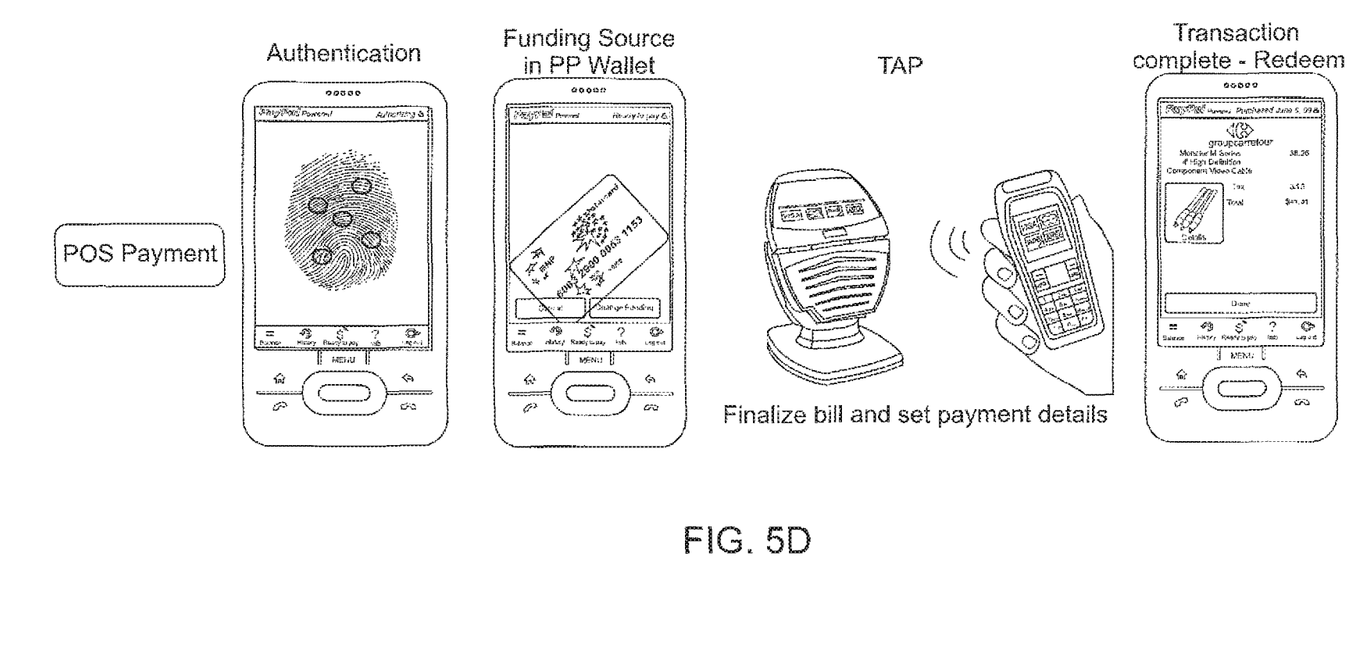

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer system for providing cloud-based application security, comprising:
 a client device, comprising:
  a global positioning system (GPS), and
  a graphical user interface for displaying data and accepting user input from a first part of a cloud-based application running on the client device; and
 a server machine, comprising:
  a non-transitory memory, and
  one or more hardware processors coupled to the non-transitory memory and configured to read instructions from the non-transitory memory to cause the computer system to perform operations comprising:
   receiving, by a second part of the cloud-based application running on the server machine, a user request from the first part of the cloud-based application on the client device;
   determining, by the second part of the cloud-based application, a plurality of security challenges for authorizing the user request based on a plurality of security settings of a user account associated with the user request and based on one or more attributes of the user request;
   providing, by the second part of the cloud-based application, a first-level authorization challenge and a second-level authorization challenge to the first part of the cloud-based application based on the determining;
   identifying, by the second part of the cloud-based application, a plurality of available resources from the user account for the user request; and
   responsive to successful completion of the first-level authorization challenge and the second-level authorization challenge, applying automatically by the second part of the cloud-based application, two or more of the available resources from the user account to fulfill the user request, wherein the automatic applying is based on the one or more attributes of the user request and based a physical location of the client device.

2. The computer system of claim 1, wherein the first part of the cloud-based application running on the client device attends to the request at a first time based on an offline history associated with the user account without communicating with the server machine, and at a later time provides the request to the second part of the cloud-based application for further processing.

3. The computer system of claim 1, wherein the first part of the cloud-based application and the second part of the cloud-based application are physically isolated from the plurality of available resources of the user account.

4. The computer system of claim 1, wherein at least one of the first-level authorization challenge or the second-level authorization challenge is associated with a trusted element on the client device.

5. The computer system of claim 1, wherein at least one of the first-level authorization challenge or the second-level authorization challenge is based on a sensitivity level associated with the request.

6. The computer system of claim 1, wherein at least one of the first-level authorization challenge or the second-level authorization challenge is based on an amount of requested resources associated with the request.

7. The computer system of claim 1, wherein the request is generated based on a short-range wireless interaction involving the client device and another computing device of a different party.

8. A non-transitory machine-readable medium having stored thereon machine-readable instructions executable to cause a cloud-based application running on a server machine to perform operations comprising:
   determining a plurality of security challenges for authorizing a request from a client device based on a plurality of security settings of a user account and one or more attributes associated with the request, the request being from a client application running on the client device that is linked to the cloud-based application running on the server machine;
   providing a first-level authorization challenge, a second-level authorization challenge, and a third-level authorization challenge to the client application based on the determining; and
   responsive to successful completion of the first-level authorization challenge, the second-level authorization challenge, and the third-level authorization challenge, applying automatically by the cloud-based application, two or more available resources from the user account to fulfill the request, the applying being based on the one or more attributes of the request and also based a physical location of the client device.

9. The non-transitory machine-readable medium of claim 8, wherein the cloud-based application on the server machine and the client application linked to the cloud-based application on the server machine are isolated from the user account.

10. The non-transitory machine-readable medium of claim 8, wherein at least one of the first-level authorization challenge, the second-level authorization challenge, or the third-authorization challenge is based on the physical location of the client device.

11. The non-transitory machine-readable medium of claim 8, wherein at least one of the authorization challenges is based on a sensitivity level associated with the request, and wherein at least one of the authorization challenges is based on the physical location of the client device.

12. The non-transitory machine-readable medium of claim 8, wherein at least one of the authorization challenges is based on an amount of requested resources from the plurality of requested resources, and wherein at least one of the authorization challenges is based on the physical location of the client device.

13. The non-transitory machine-readable medium of claim 8, wherein at least one of the authorization challenges is based on an amount of requested resources from the plurality of requested resources, wherein at least one of the authorization challenges is based on a sensitivity level associated with the request, and wherein at least one of the authorization challenges is based on the physical location of the mobile device.

14. The non-transitory machine-readable medium of claim 8, wherein the cloud-based application running on the server machine combines more than two resources associated with the user account to fulfill the request.

15. A computer-implemented method for providing cloud-based application security, comprising:
   generating, by a server part of a cloud-based application running on a server machine, a plurality of security challenges for authorizing a resource request received from a corresponding part of the cloud based application running on a remote device, the generating being based on a plurality of security settings of a user account associated with the resource request and also based on one or more attributes of the resource request;
   identifying, by the server part of the cloud-based application, a plurality of resources from the user account available for the resource request; and
   responsive to successful completion of each one of the plurality of security challenges, applying automatically without user involvement by the server part of the cloud-based application, a plurality of the available resources from the user account to fulfill the resource request, wherein the automatic applying is based on the one or more attributes of the request and also based a physical location of the remote device at the time of the request.

16. The computer-implemented method of claim 15, wherein the corresponding part of the cloud-based application running on a remote device completes the resource request locally in an offline mode when unable to communicate with the server part of the cloud-based application and later provides the resource request to the server part for completion after reestablishing communication with the server part.

17. The computer-implemented method of claim 15, wherein one or more of the security challenges are configured to be launched from a trusted element on the remote device.

18. The computer-implemented method of claim 15, wherein the applying of the plurality of available resources is further based on a plurality of rules associated with the user account.

19. The computer-implemented method of claim 15, wherein the security challenges are provided to a user of the remote device via a combination of computer hardware and computer software based on the one or more attributes of the resource request and the physical location of the remote device.

20. The computer-implemented method of claim 15, wherein the corresponding part of the cloud-based application running on the remote device first completes the resource request locally when operating under a limited-power condition and then later provides the resource request to the server part of the cloud-based application for further processing when operating without the limited-power condition.

\* \* \* \* \*